(12) United States Patent
Wu et al.

(10) Patent No.: US 7,816,901 B2
(45) Date of Patent: Oct. 19, 2010

(54) PWM MODULATOR FOR SCALABLE CONVERTERS

(75) Inventors: Wenkai Wu, East Greenwich, RI (US); George Schuellein, Narragansett, RI (US)

(73) Assignee: International Rectifier Corporation, El Segundo, CA (US)

( * ) Notice: Subject to any disclaimer, the term of this patent is extended or adjusted under 35 U.S.C. 154(b) by 258 days.

(21) Appl. No.: 11/975,469

(22) Filed: Oct. 19, 2007

(65) Prior Publication Data

US 2008/0094049 A1    Apr. 24, 2008

Related U.S. Application Data

(60) Provisional application No. 60/862,222, filed on Oct. 20, 2006.

(51) Int. Cl.
*G05F 1/40* (2006.01)
(52) U.S. Cl. .......................................... 323/288; 323/284
(58) Field of Classification Search ................... 363/72, 363/97, 98, 132; 323/282–285, 288
See application file for complete search history.

(56) References Cited

U.S. PATENT DOCUMENTS

| | | | |
|---|---|---|---|
| 5,198,971 A | 3/1993 | Recker et al. | |
| 6,433,527 B1 | 8/2002 | Izadinia | |
| 6,803,750 B2 | 10/2004 | Zhang | |
| 6,912,144 B1 | 6/2005 | Clavette | |
| 7,019,502 B2 | 3/2006 | Walters et al. | |
| 7,026,798 B2 * | 4/2006 | Cheung et al. | 323/225 |
| 7,106,130 B2 | 9/2006 | Gan et al. | |
| 7,109,691 B2 | 9/2006 | Brooks et al. | |
| 7,282,897 B2 * | 10/2007 | Moussaoui et al. | 323/272 |
| 2006/0055387 A1 | 3/2006 | Steele | |

* cited by examiner

*Primary Examiner*—Jessica Han
(74) *Attorney, Agent, or Firm*—Farjami & Farjami LLP

(57) ABSTRACT

A PWM modulator for generating a PWM control signal for operating transistor switches of a phase of a multi-phase converter including a plurality of ramp generators, each ramp generator receiving a dedicated clock input signal corresponding to a phase of the multi-phase converter and providing a ramp signal starting when the dedicated clock signal is received by the ramp generator, one of the plurality of ramp generators being dedicated to provide the PWM control signal; a plurality of comparators, each comparator associated with a respective ramp generator for terminating the ramp signal when a predefined inequality exists between an error amplifier output of a feedback loop of the multi-phase converter and an output of the associated ramp generator; a plurality of current generator circuits, each current generator circuit associated with a respective ramp generator for providing current to the dedicated ramp generator to control the slope of the ramp signal of the dedicated ramp generator, the dedicated ramp generator controlling its associated comparator to provide the PWM control signal; and a plurality of current generator control circuits for controlling the operation of the plurality of current generator circuits.

15 Claims, 4 Drawing Sheets

PWM MODULATOR FOR SCALABLE CONVERTERS

CROSS-REFERENCE TO RELATED APPLICATION

This application is based on and claims priority to U.S. Provisional Patent Application Ser. No. 60/862,222, filed on Oct. 20, 2006 and entitled PWM MODULATOR FOR SCALABLE CONVERTERS, the entire disclosure of which is hereby incorporated by reference.

BACKGROUND OF THE INVENTION

The present invention relates to optimizing designs in scalable converter systems and more particularly to keeping a system loop gain unchanged while one converter in a scalable converter system is turned on while other converters are not.

In a multi-phase converter, for example, a multi-phase buck converter illustrated in FIG. 1, a plurality of buck converters are provided each having their output inductors $L_N$ coupled to the output node $V_{OUT}$. In the application shown, each buck converter is controlled by a control IC 10 and may be operated such that a control switch of each buck converter switching stage is turned on at a different time than the other phases. In this way, each phase sequentially provides power to the load, reducing ripple and reducing the size of the output capacitance.

As shown, each phase IC 30 controls a buck converter comprising a switching stage of two transistors Q1 and Q2 and an output inductor $L_N$. Transistor Q1 is the control switch and transistor Q2 is the synchronous switch. A control IC 10 provides a clock signal CLKOUT, to each of the phase ICs 30 at the input CLKIN. Additional phases or phase ICs 30 can be employed depending upon the load requirements in which case the signal lines would extend to the additional phase ICs.

As shown in FIG. 1, clock signal CLKIN is provided to each phase IC 30. In addition, a reduced frequency signal PSHIN is provided to the first phase IC $30_a$. The signal PSHIN is the clock signal which sets the PWM frequency of the phase IC $30_a$. The first phase IC $30_a$ provides a signal PHSOUT to the PHSIN input of the next phase IC $30_b$ as a delayed clock signal PHSIN. If there are further phase ICs, then IC $30_b$ will provide a delayed clock signal to the next phase IC and so on.

In FIG. 1, each phase IC has a ramp generator implemented by allowing a charge to develop across a capacitor C for a period of time determined by a circuit including an amplifier A and a share adjust error amplifier B which seeks to maintain equal output currents from each of the phases. The ramp signal across capacitor C is fed as one input to PWM comparator P and another input is provided from the converter's error amplifier 9 (line EAIN). The PWM comparator compares the ramp level with the error amplifier input EAIN and produces an output PWM signal (PWM) which is fed to a latch L and then through gating/drive circuitry as the two drive signals GATEH and GATEL for driving the converter switches $Q_1$ and $Q_2$.

Converters, in such scalable converter application systems, are normally turned on sequentially with a fixed phase shift to pursue the best ripple current cancellation in both input and output sides. These converters form a closed system loop and are turned on sequentially by a shared clock signal, as described. In some applications, the number of phases times the duty ratio may be larger than 1. Some times, one converter may be turned on while other converters are not. In these cases, the gain of the system loop changes. To accommodate these cases, the system loop can not be optimized to pursue cost effective solutions.

SUMMARY OF THE INVENTION

It is an object of the present invention to provide a cost-effective scalable converter system that keeps the system loop gain constant to optimize the control loop.

It is an object of the present invention to provide a scalable converter system that avoids or reduces connections, and which provides notification among the converters/modules when converter overlap occurs (i.e., when more than one converter is on at the same time).

Provided is a PWM modulator for generating a PWM control signal for operating transistor switches of a phase of a multi-phase converter including a plurality of ramp generators, each ramp generator receiving a dedicated clock input signal corresponding to a phase of the multi-phase converter and providing a ramp signal starting when the dedicated clock signal is received by the ramp generator, one of the plurality of ramp generators being dedicated to provide the PWM control signal; a plurality of comparators, each comparator associated with a respective ramp generator for terminating the ramp signal when a predefined inequality exists between an error amplifier output of a feedback loop of the multi-phase converter and an output of the associated ramp generator; a plurality of current generator circuits, each current generator circuit associated with a respective ramp generator for providing current to the one of the ramp generators providing the PWM control signal to control the slope of the ramp signal of the dedicated ramp generator, the dedicated ramp generator controlling its associated comparator to provide the PWM control signal; and a plurality of current generator control circuits for controlling the operation of the plurality of current generator circuits.

Other features and advantages of the present invention will become apparent from the following description of the invention that refers to the accompanying drawings.

DETAILED DESCRIPTION OF EMBODIMENTS OF THE INVENTION

Figure 1A:
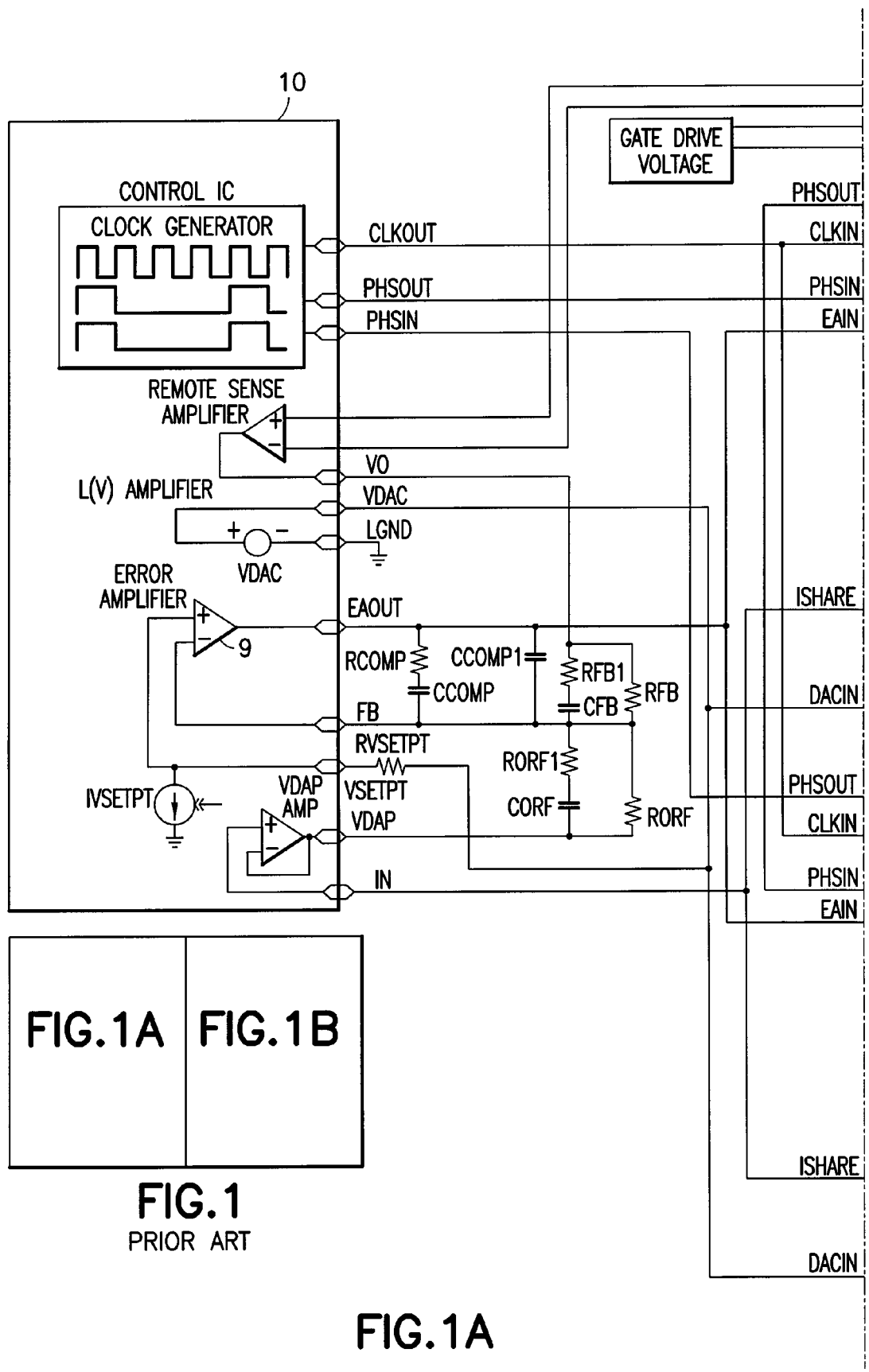
FIG. 1 is a diagram of a two-phase multi-phase converter.
Figure 1B:
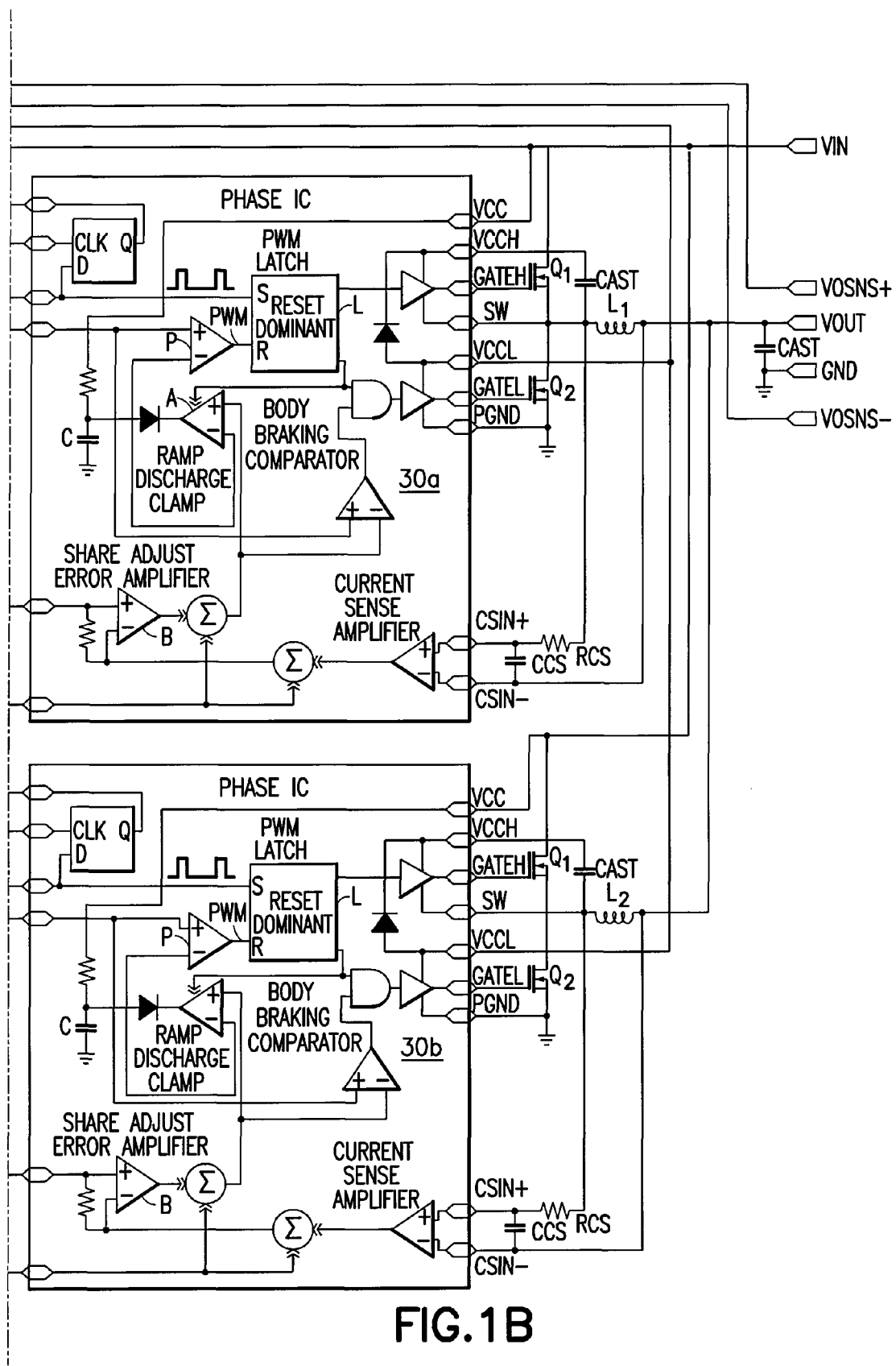
Figure 2:
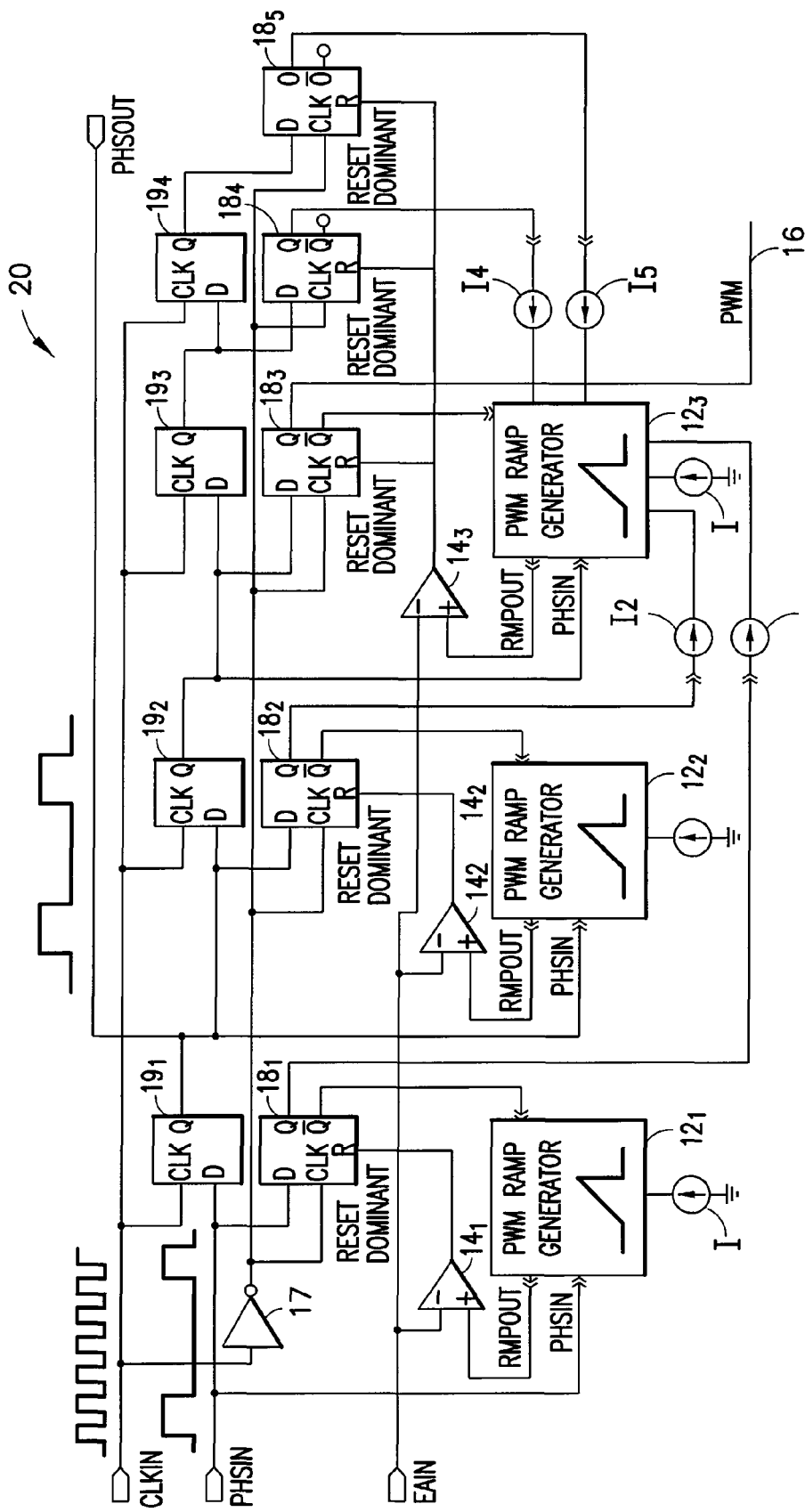
FIG. 2 is a diagram of a PWM modulator of a preferred embodiment of the present invention for use with a three phase converter.

Rather than implementing one RAMP generator per phase, as in the PWM controller of FIG. 1, the preferred embodiment of the present invention implements several RAMP generators in one PWM modulator 20 shown in FIG. 2. The modulator will have the same number of ramp generators as there are phases in the multi-phase converter. Each ramp generator has a current source I for generating the ramp voltage, e.g., by charging a capacitor. Each implemented RAMP generator corresponds to a dedicated clock signal PHSIN corresponding to a phase of the multi-phase converter. The RAMP starts when the RAMP generator receives the corresponding clock signal pulse, and each RAMP is terminated by the PWM comparator when the RAMP exceeds the voltage loop error amplifier output EAIN.

One of the RAMP generators $12_3$ is used to provide PWM. The other ramp generators $12_1$ and $12_2$ are used to monitor the operations of other converters of the multi-phase converter, and each RAMP generator controls one current source $I_1$, $I_2$ for the RAMP generator $12_3$ that provides the PWM. In addition, the RAMP generator $12_3$ will have more current sources introduced ($I_4$ and $I_5$), one current source per clock, if RAMP has not been terminated by the PWM comparator. Accordingly, the PWM modulator 20 of the invention will determine how many converters are ON and change the slope correspondingly, to keep the loop gain unchanged.

FIG. 2 shows the PWM modulator 20 of a preferred embodiment of the present invention for use with a three phase converter. The PWM modulator 20 includes a plurality of RAMP generators 12. Each RAMP generator 12 starts in correspondence with a dedicated clock signal PHSIN, which sets the frequency of the respective PWM RAMP generator $12_1$, $12_2$, and $12_3$. The frequency of the first RAMP generator $12_1$ is set by the signal PHSIN received by the PWM modulator 20. The following RAMP generators $12_2$ and $12_3$ receive delay clock signals from respective circuits $19_1$ and $19_2$, for example D flip-flops which delay the signal PHSIN by the clock cycle of CLKIN. In an N-phase converter, the circuits 20 each include N RAMP generators 12, circuits 19, and circuits 18. The circuits 18 may also be implemented as D flip-flops.

The circuits 19 receives the clock signal CLKIN and the signal PSHIN and provide an output signal that is used as the signal PSHIN by the following RAMP generator and circuits 18 and 19. The flip-flop circuits 18 accept the inverse of the clock signal CLKIN from an inverter 17 and the signal PHSIN. Additionally, the output signal of the first of the circuits $19_1$ is provided as the signal PSHOUT to the following Phase IC (See FIG. 1). As shown in FIG. 2, the output signal of the flip-flops $18_1$, $18_2$, $18_4$, $18_5$ controls the current sources for the RAMP generator $12_3$ that provides PWM.

The RAMP starts and builds until the RAMP generator 12 receives a corresponding termination signal, the inverse of output signal Q, from the flip-flop 18. The signal RAMPOUT generated by the RAMP generator is compared by the PWM comparator $14_1$, $14_2$, and $14_3$ with the signal EAIN from the voltage loop error amplifier 9 (see FIG. 1). If signal RAMPOUT exceeds the output signal EAIN, the PWM comparator 14 sends a reset signal to the flip-flop 18, which will reset the flip-flop 18 and send the inverse output signal to the respective RAMP generator 12, terminating the ramp.

Only the RAMP generator $12_3$ is used for PWM modulation 16. Thus, comparator $14_3$ provides a reset to flip-flop $18_3$, whose output is the PWM signal for controlling the switches (via further gating/drive circuitry). The other RAMP generators $12_1$ and $12_2$ are used to monitor the operations of the other converters of the multi-phase converter, and each RAMP controls one equal current source $I_1$, $I_2$ for the PWM producing RAMP generator $12_3$. In addition, the RAMP generator $12_3$ will have more current sources $I_4$ and $I_5$ introduced, one current source per clock pulse, if the RAMP has not been terminated by the PWM comparator. With such an arrangement, the PWM modulator will determine how many converters are ON at anytime and change the slope correspondingly to keep the loop gain unchanged.

For example, when ramp generators $12_1$ and $12_2$ are not reset, i.e., the ramps are building up, the Q outputs of the flip-flops $18_1$ and $18_2$ are set high and both current sources $I_1$ and $I_2$ are on. This increases the charging current to the RAMP generator $12_3$, thus maintaining the loop gain. Once the RAMP exceeds EAIN, flip-flop $18_1$ and $18_2$ are reset, their Q outputs go low and the current sources $I_1$ and $I_2$ are turned off.

From the above, it can be determined that phases 1 and 2 are on whenever ramp generators $12_1$ and $12_2$ are not reset, and thus the number of converter (phases) that are on can be ascertained to maintain the loop gain.

Should the RAMP not be terminated by the PWM comparator, i.e., when the RAMP has not risen to the value of EAIN (for example, due to a large load step which causes a large error voltage EAIN), the additional current sources $I_4$ and $I_5$ can be turned on after additional clock periods implemented by the delays of flip-flops $19_3$ and $19_4$.

Figure 3:
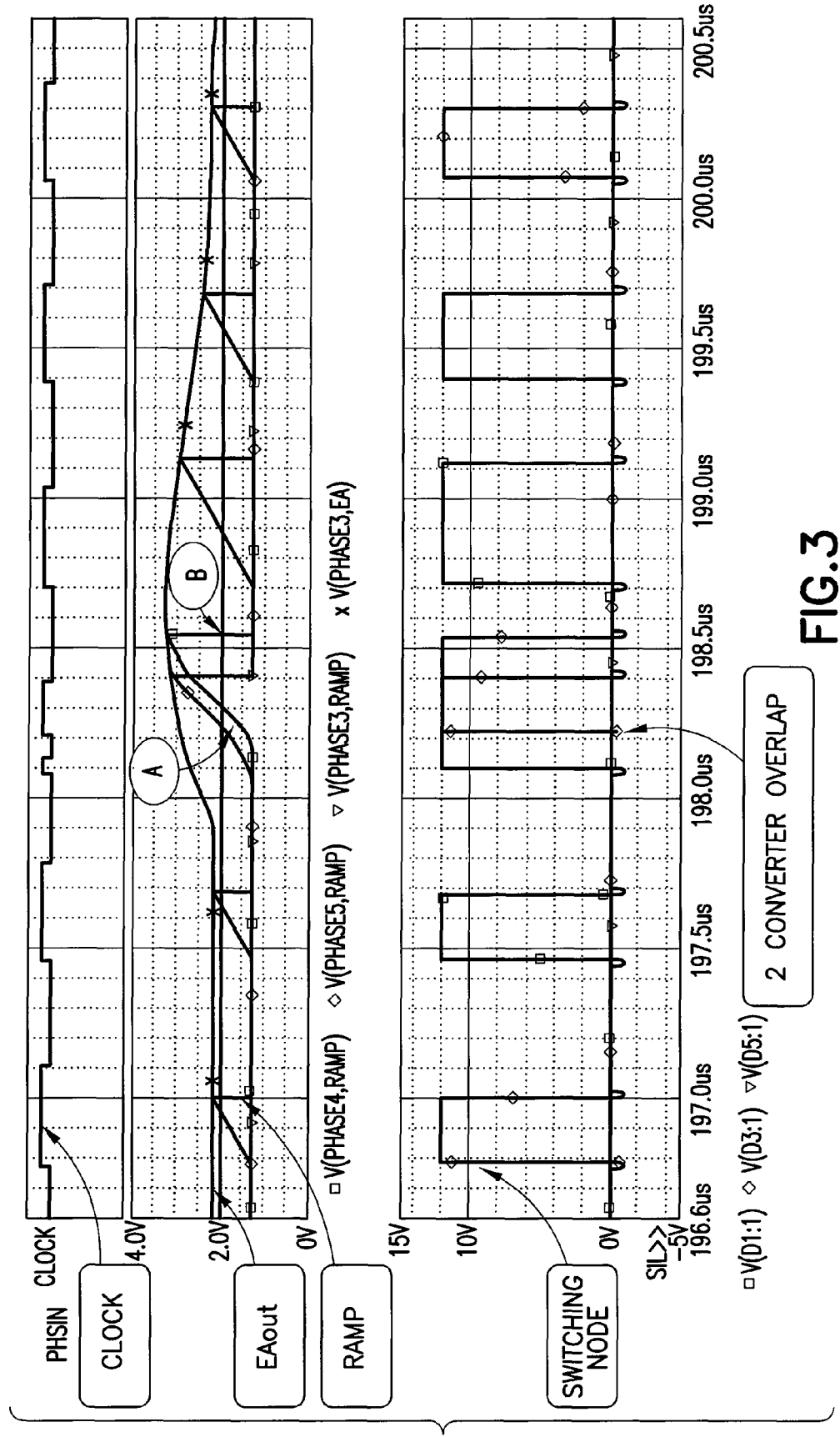
FIG. 3 is a graph of operation signals of the PWM modulator of FIG. 2.

FIG. 3 shows a graph of RAMP A that has not been terminated by the PWM comparator when the next clock pulse is received. The ramp slope has doubled due to two current sources $I_4$ and $I_5$ charging the RAMP generator. At the same time, RAMP B of a different phase has two current sources charge the RAMP due to one of its internal RAMP generators $12_1$ and $12_2$ "simulating" RAMP A and therefore another current source is enabled.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A PWM modulator for generating a PWM control signal for operating transistor switches of a phase of a multi-phase converter comprising:

a plurality of ramp generators, each ramp generator receiving a dedicated clock input signal corresponding to a phase of the multi-phase converter and providing a ramp signal starting when the dedicated clock signal is received by the ramp generator, one of the plurality of ramp generators being dedicated to provide said PWM control signal;

a plurality of comparators, each comparator associated with a respective ramp generator, each comparator of the plurality of comparators configured for terminating the ramp signal when a predefined inequality exists between an error amplifier output of a feedback loop of the multi-phase converter and an output of the associated ramp generator;

a plurality of current generator circuits, each current generator circuit associated with a respective ramp generator for providing current to the one of the ramp generators providing the PWM control signal to control the slope of the ramp signal of the dedicated ramp generator, said dedicated ramp generator controlling its associated comparator to provide said PWM control signal; and a plurality of current generator control circuits for controlling the operation of the plurality of current generator circuits.

2. The PWM modulator of claim 1, further comprising an additional current generator circuit for controlling at least one additional current generator for the dedicated ramp generator when the ramp signal has not been terminated by the comparator associated with the dedicated ramp generator.

3. The PWM modulator of claim 1, wherein each of the ramp generators except the dedicated ramp generator corresponds to another phase of the multi-phase converter and monitors the operation of the corresponding phase.

4. The PWM modulator of claim 3, wherein a gain of the feedback loop is kept unchanged by determining the number of phases of the multi-phase converter that are ON and accordingly changing the slope of the ramp signal.

5. The PWM modulator of claim 1, wherein if the output of the ramp generator exceeds the error amplifier output the comparator resets the associated current generating circuit thereby signaling the ramp generator to terminate the ramp.

6. The PWM modulator of claim 5, wherein the plurality of ramp generators other than the dedicated ramp generator are used to monitor operations of other phases of the multi-phase converter and each ramp signal controls one equal current source for the dedicated ramp generator.

7. The PWM modulator of claim 6, wherein when the ramp signal has not been terminated by the comparator during a clock period, the dedicated one of the ramp generators will have more current sources introduced, one current source per clock cycle, allowing the PWM modulator to determine how many phases of the multi-phase converter are ON and to change the slope of the ramp signal to keep the feedback loop gain unchanged.

8. A pulse width modulation (PWM) modulator to operate a plurality of transistor switches of a multi-phase converter, said PWM modulator comprising:
   a plurality of ramp generators, each of said plurality of ramp generators corresponding to a phase of said multi-phase converter;
   a plurality of comparators, one of said plurality of comparators configured to terminate a ramp signal of a dedicated ramp generator within said plurality of ramp generators when said ramp signal substantially exceeds an error signal of said multi-phase converter;
   wherein said PWM modulator operates to keep a system loop gain of said multi-phase converter substantially constant.

9. The PWM modulator of claim 8, further comprising at least one current generator circuit capable of controlling said ramp signal of said dedicated ramp generator.

10. The PWM modulator of claim 9, further comprising at least one current generator control circuit adapted to control an operation of said at least one current generator circuit.

11. The PWM modulator of claim 10, further comprising at least one additional current generator circuit adapted to control said dedicated ramp generator when said ramp signal has not been terminated.

12. The PWM modulator of claim 8, wherein each of said plurality of ramp generators other than said dedicated ramp generator monitors an operation of another phase of said multi-phase converter.

13. The PWM modulator of claim 12, wherein said monitoring of said operation comprises determining a number of phases of said multi-phase converter that are ON and changing a slope of said ramp signal of said dedicated ramp generator.

14. The PWM modulator of claim 8, wherein said terminating said ramp signal comprises resetting an associated current generating circuit.

15. The PWM modulator of claim 14, wherein one of said plurality of ramp generators other than said dedicated ramp generator monitor an operation of another phase of said multi-phase converter.

* * * * *